Figure 1:
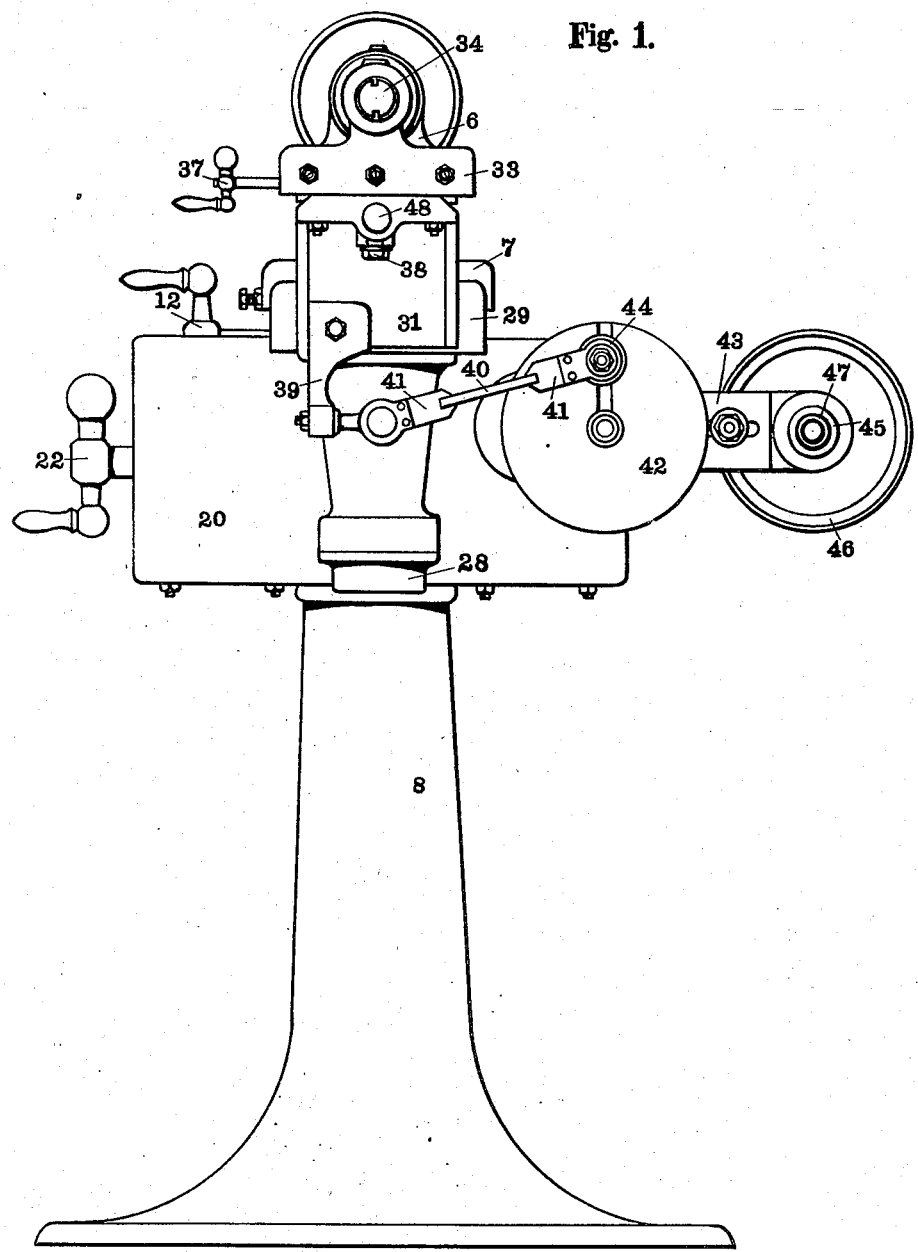

E. SACHS.
GRINDING MACHINE.
APPLICATION FILED FEB. 17, 1908.

918,769.

Patented Apr. 20, 1909.
3 SHEETS—SHEET 3.

Witnesses:
M. A. Jones.
Edward R. Whitman

Inventor
Ernst Sachs,
By Julian C. Dowell &c.
his Attys.

UNITED STATES PATENT OFFICE.

ERNST SACHS, OF SCHWEINFURT, GERMANY.

GRINDING-MACHINE.

No. 918,769.  Specification of Letters Patent.  Patented April 20, 1909.

Application filed February 17, 1908. Serial No. 416,313.

*To all whom it may concern:*

Be it known that I, ERNST SACHS, a subject of the King of Bavaria, residing at No. 24 Schultes street, Schweinfurt, Germany, have invented new and useful Improvements in Grinding-Machines, of which the following is a specification.

This invention relates to grinding machines, and especially to machines of this kind, adapted to finish the race grooves of semi-circular cross section, preliminarily formed in the members of ball bearings consisting of concentric rings of hardened steel. The said race ways or grooves are provided in the peripheries or in the lateral faces of the rings, according as they are to be employed in journal-bearings or in thrust-bearings respectively. In order to enable the bearing to bear a high load, without causing undue friction or ready wear and tear, the radius of curvature of the cross section of the race ways is to bear a definite proportion to the diameter of the balls running in the said grooves.

The object of this invention is to provide a grinding machine which automatically and accurately forms or finishes those race grooves according to any arc or radius of a circle, being at the same time suitable for working different sizes of rings and grooves.

A further object of this invention is to permit of ready controlling of the work or of removing a ring and placing another in the machine without changing or altering the adjusted position of the operative parts. These objects are attained by so arranging the operative parts of the machine that the work is merely rotated but not displaced from its determined position during the grinding operation, while the grinding wheel is imparted an oscillating reciprocation in front of the work, its periphery contacting the above-said race-groove which therefore is cleaned and at the same time formed according to the arc of a circle.

The desired radius of curvature can be determined or attained by adjusting the tool holder in such a manner that the periphery of the grinding wheel projects beyond the axis of oscillation precisely by the size of the respective radius. In order to enable the working of rings of different diameter, the entire oscillating tool-supporting means may be displaceable, so as to adjust the axis of oscillation at any required distance from the axis of rotation of the work. As may easily be understood, greatest accuracy is necessary for exactly adjusting the parts in their required relative positions, which makes it desirable not to remove them therefrom afterward. For this reason, the work holder which is not given a regulation relatively to the radius is movably fixed, so as to be withdrawn for the purpose of gaging or replacing the work.

This invention consists in several improvements embodied by the different relatively adjustable and coöperating devices of the machine the details, construction and operation of which will be hereinafter described.

A machine according to this invention is illustrated in the accompanying drawings, forming part of this specification, and in which—

Figure 2:
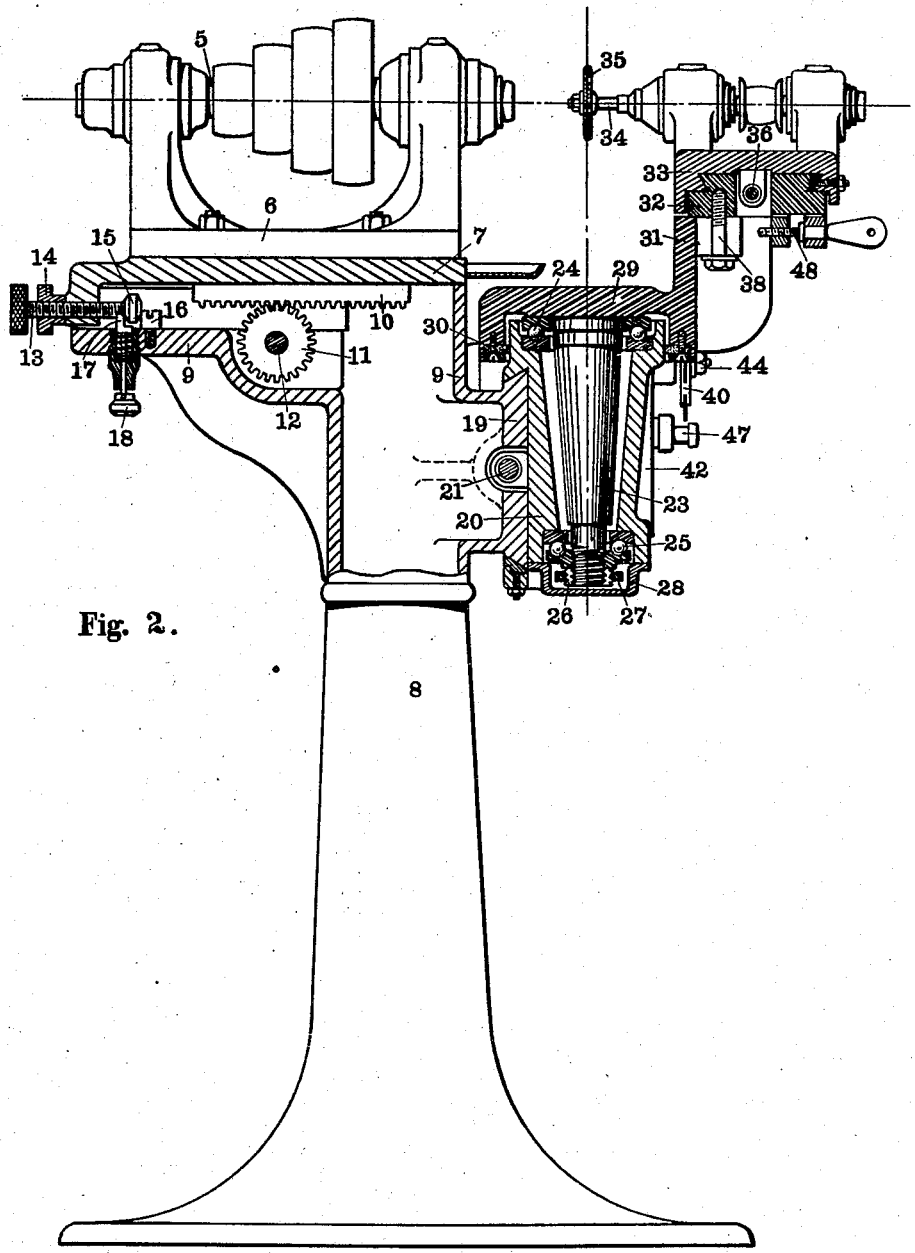
Figure 3:
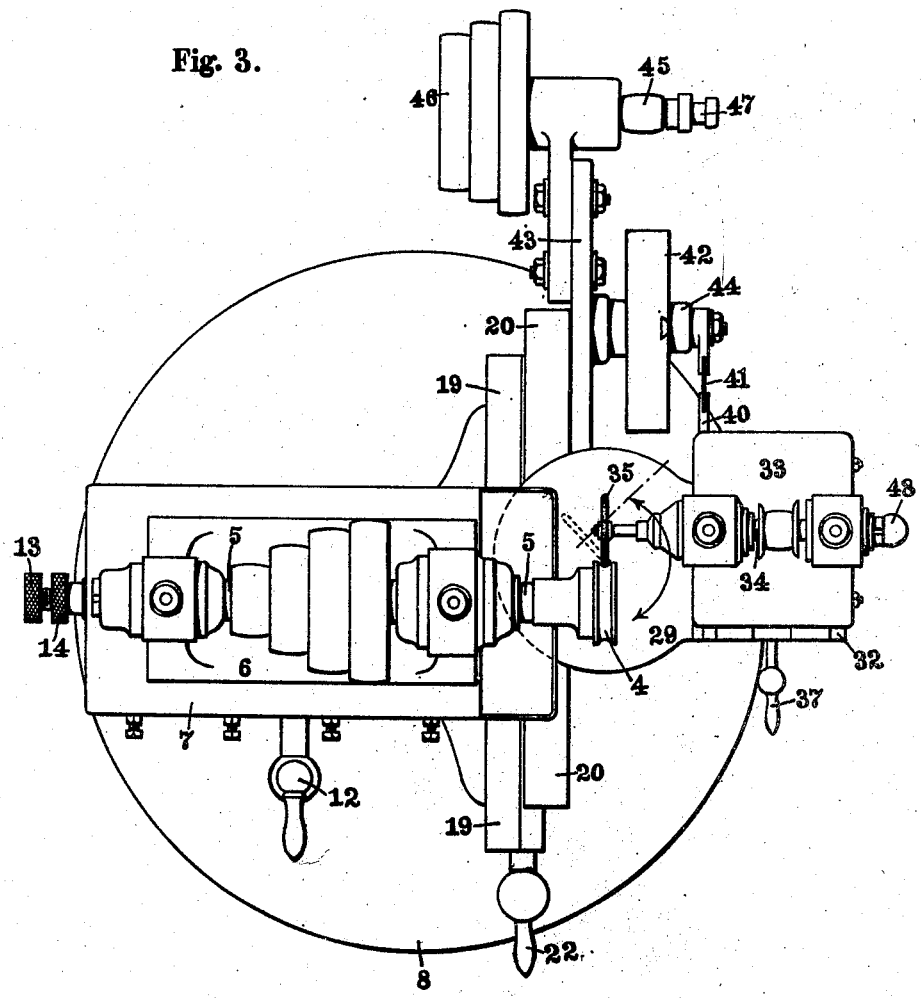

Figure 1 is a front elevation of the grinding machine, Fig. 2 an end view from the left hand side in Fig. 1, partly in vertical sectional elevation, and Fig. 3 a ground plan of the machine.

Similar numerals designate similar parts throughout the several figures of the drawings.

A shaft 5 to the end of which a suitable chuck can be affixed for receiving the work 4, as shown in Fig. 3, is journaled in bearings 6 on a slide 7, a step pulley being wedged upon it and connected by belt to an intermediate gearing (not shown). The slide 7 is movable in guides upon the body or frame 9 of the machine, mounted on a base or standard 8, in a direction parallel with the axis of the shaft 5, which displacement, to and fro, can be produced by means of a convenient hand-operated device, for instance, a rack 10 may be affixed to the lower side of the slide and engaged with a gear wheel 11 mounted on the shaft of a hand crank 12 which is rotatable in bearings formed on the frame 9. On the rear end of the slide 7 is provided an adjustable thumb screw 13 engaged in corresponding threads of a bracket projecting from the slide, and fixable by means of a lock-nut 14, a bulb or button 15 formed on its inner end being in front of a stop 16 and gripped by a fork-ended claw 17 which embraces the bolt part of the screw, the slide thus being immovably fixed in the position in which it has been adjusted by rotating the screw 13. The claw 17 is yieldingly pressed inward through a spring wound around its shaft on the outer end of which a button or handle 18 is attached which serves for withdrawing or disengaging the claw 17, when the slide 7 can easily be moved backward. When the slide is then returned the bulb 15 meets the stop 16, and the previous position thereby reattained by the work holder, will be maintained by the claw latching behind that button 15.

A slide 20 is movable on guides 19 formed upon the frame 9, in a direction at right angles to the axis of the shaft 5, this movement is obtained in the usual manner by the operation of a screw spindle 21 and a hand crank 22 connected thereto. The slide bears a bracket 31 oscillating around a vertical axis (as indicated in Fig. 2), which bracket supports the shaft 34 of the grinding wheel 35 in such a height that the axes of the work shaft 5 and of the tool shaft 34 lie in a vertical plane (as shown in Fig. 2). A pulley affixed to the shaft 34 will be driven by a belt gearing (not shown).

The appliance enabling the oscillation of the grinding apparatus consists in a tapering pivot or bolt 23 inclosed in a sleeve formed in one piece with or rigidly connected to the slide 20, ball bearings 24 and 25 being provided on the upper and lower ends of this pivot, respectively. A cap 29 carried by the bolt 23 and surrounding the upper end of the above-said sleeve, bears the bracket 31 upon which the grinding apparatus is mounted in the manner hereinafter described. The lower end of the bolt 23 has formed thereon screw threads engaging corresponding female threads of the rotatable race ring of the lower ball bearing 25 which can therefore be adjusted by this means. A sleeve-shaped extension 26 longitudinally split and having a conical screw thread in its outer circumference, is formed in one piece with the aforesaid race ring, so that a nut 27 screwed on to the sleeve 26 will contract and firmly hold the same in its position on the threaded bolt, after the race ring has been screwed home and adjusted, until the ball bearings are perfectly tight, and back-lash removed therefrom. This adjustability and the special accurate bearing construction prevent vibrating of the machine which would injure the exactness and precision of the work. The cap 29 is provided with a packing 30 of felt, leather or the like, while the lower end of the sleeve surrounding the bolt 23 is closed by a cover 28 attached thereto in any convenient manner, the whole device which allows the grinding apparatus to oscillate around the vertical axis of the bolt 23, thus being effectively protected from dust, wheel swarf and the like.

The slide 33 from which the bearings of the tool shaft 34 rise, can be displaced on a guide 32 by means of a hand crank 37 and screw spindle 36 in a direction parallel with that of the slide 20, while the guide 32 is displaceable in a direction at right angles thereto; any suitable means capable of producing this movement may be employed therefor, such as an adjusting screw 48 rotatably connected to the guide 32 and engaging corresponding threads in a cross piece of the bracket 31, so that the guide can be moved upon and with respect to the latter forward and backward, a bolt 38 screwed into the sliding guide thereby working in a slot formed in a projection of the bracket 31. When the desired position of the parts is thus obtained, the guide is immovably fixed by tightening the bolt 38. The object of this displacement is to adjust the grinding wheel in that position in which the axis of the pivot 23 lies in its middle plane, which adjustment is required very seldom and only in the case that a new grinding wheel must be affixed to the shaft 34.

The slide 20 permits of displacing the whole grinding apparatus, as the diameter of the work may require, and at the same time in conformity with the radius of the groove to be cleaned or finished, while the slide 33 serves for moving the grinding wheel to such a position that the amount by which its periphery projects beyond the axis of oscillation is equal to the desired radius of curvature, and for feeding the wheel when worn off.

An arm 39 hanging downward from the bracket 31 and rigidly fastened thereon, is hinged to one end of a connecting rod 40, the other end of which is attached to a crank pin 44 which is fixed upon a disk 42 and adjustable in a radial slot of the same, so that the amount of stroke can be altered if desired. The rod 40 is rendered articulate or flexible near its ends by the insertion of convenient links, such as the spring plates 41, shown in Fig. 1, which impart to the rod the required yieldingness which must be present, when the grinding apparatus is oscillating around the vertical axis of the bolt 23. Of course, any well known universal joint producing the same effect, may be employed, instead of the springs. The disk 42 is connected with a small pulley 45 by a belt (not shown), said pulley together with step pulleys 46 constitute an intermediate gearing journaled in an extensible projection 43 of the slide 20 which allows of tightening the belt. The pulley 45 is loose upon the shaft of the gearing, but it can be coupled with it, at will, by means of a clutch device 47 of any preferred or well known construction, description of details thereof may therefore be dispensed with.

The grinding machine is operated as follows: When a roughly worked and hardened race ring 4 having a groove of the approximate shape, has been attached to the shaft 5 by means of a convenient chuck, the slide 7 will be advanced so far that the axis of oscillation of the grinding apparatus lies in the middle plane of the groove to be finished. The desired position of the work holder is fixed by screwing down the screw 13, until it contacts the stop 16, and then locking its position by means of the nut 14, the clench 17 thereby engaging behind the button 15, so that when the slide has occasionally been withdrawn, for the purpose of measuring or interchanging the work by another of the same dimensions, and will thereafter be returned, it will assume exactly the prior position, owing to the stop device. The slide 20 is now displaced in the required direction, until the axis of oscillation of the pivotal grinding apparatus passes the center of the arc of a circle to be described in the cross section of the race groove, while the grinding wheel 35 will be made to approach the work by displacing the slide 33 to such extent that the periphery of this wheel projects beyond the said axis of oscillation by the size of the desired radius. This movement may be realized at a stroke or by gradually feeding the tool.

When the machine is now started by setting in rotation the shafts 5 and 34, and simultaneously connecting the clutches 47 of the continuously driven intermediate belt gear 45, 46, the rotating work will be ground on its whole circumference by the grinding wheel 35, however, the tool supporting means being pivotally reciprocated by the crank gear, the grinding wheel will also form, in the circumference of the work, a groove the cross section of which is exactly an arc of a circle.

When it is desired to interrupt the operation of the machine or to affix a new work, the work shaft 5 and the tool shaft 34 are stopped, while the clutches 47 will be disconnected. By turning the crank disk 42 by hand, the grinding wheel will now be brought into the position shown in Fig. 3 by dotted lines, whereby it is swung out of the groove so that the slide 7 together with the shaft 5 can easily be withdrawn, after disengagement of the claw device 17, 18. In this position, the work is free and removed from the grinding wheel, and easy to be gaged or interchanged. This machine may also be used to clean the grooves formed in the inner periphery or in the lateral faces of such rings, when it is merely necessary to adjust the various mechanisms accordingly.

It will be understood that the details of construction of the grinding machine may be varied in different ways without altering the operation of the machine and the principle of invention. I, therefore, do not wish to be limited to the construction hereinbefore described for purpose of example, but What I broadly claim as my invention, and desire to secure by Letters Patent, is—

1. In a machine for forming race grooves of ball bearings, the combination of a rotating work holder and a rotating tool holder mounted on parallel driving shafts arranged in different vertical planes, the tool shaft being carried by an oscillatory support, means for adjusting said work holder in the direction of its axis, means for adjusting said tool holder in the direction of the axis of said work holder and also at an angle thereto, and mechanism for oscillating said tool holder.

2. In a grinding machine for forming race grooves of ball bearings, the combination with a rotating work carrier, of a pivotally supported rotating grinding wheel, said work carrier and grinding wheel being mounted on parallel driving shafts arranged in different vertical planes and means for oscillating the grinding wheel, the axis of oscillation being vertical to the axes of rotation of the work and of the grinding wheel.

3. In a grinding machine for forming race grooves of ball bearings, the combination with a rotating work carrier, of means for displacing the said work carrier in a direction parallel with the axis of the work, means for adjustably fixing and temporarily releasing the work carrier, a pivotally supported rotating grinding wheel, and means for oscillating the wheel.

4. In a grinding machine for forming race grooves of ball bearings, the combination with a rotating work carrier, of a slide bearing the work carrier, means for displacing the slide in a direction parallel with the axis of the work, an adjustable contact and stop device for fixing the slide, a catch allowing releasing of the slide, a pivotally supported rotating grinding wheel, and means for oscillating the grinding wheel.

5. In a grinding machine, a rotating work holder mounted on a shaft which is journaled upon a movable support or slide, in combination with a tool holder and mechanism for moving said slide in a direction parallel with the axis of said shaft, together with a stop device and means coöperating therewith for locking said slide in a fixed position at a predetermined point in its advancing movement, said locking means being adjustable to vary the distance said slide may move.

6. In a grinding machine for forming race grooves of ball bearings, the combination with rotating work supporting means, of a rotating grinding wheel, a pivot supporting the grinding wheel, and a crank gear for oscillating the grinding wheel on the pivot.

7. In a grinding machine for forming race grooves of ball bearings, the combination with a rotating work holder, of a rotating grinding wheel, a slide displaceable at right angles to the axis of the work, a pivot mounted on the said slide and supporting the grinding wheel, and means for oscillating the grinding wheel on the pivot.

8. In a grinding machine for forming race grooves of ball bearings, the combination with a rotating work holder, of a rotating grinding wheel, a slide displaceable at right angles to the axis of the work, a pivot mounted on the slide, means carried by the pivot and supporting the grinding wheel, said means being displaceable in directions parallel with the axis of the wheel and at right angles thereto, and means for oscillating the grinding wheel on the pivot.

9. In a grinding machine for forming race grooves of ball bearings, the combination with a rotating work holder, of a rotating grinding wheel, a pivot supporting the grinding wheel, a sleeve inclosing the pivot, ball bearings arranged between the sleeve and the pivot at either end, and means for oscillating the pivot.

10. In a grinding machine for forming race grooves of ball bearings, the combination with a rotating work holder, of a rotating grinding wheel pivotally supported in front of the work holder, a crank, and a connecting rod between the tool support and the crank having flexible connecting portions near its ends.

11. In a grinding machine for forming race grooves of ball bearings, the combination with a rotating work holder, of a rotating grinding wheel pivotally supported in front of the work holder, a crank disk having a radially adjustable crank pin, a flexible connecting rod between the said pin and the wheel support, an intermediate belt gearing driving the crank, and clutches adapted to uncouple the crank.

12. In a grinding machine for forming race grooves of ball bearings, the combination with a rotating work holder displaceable parallel with the axis of the work, of a rotating grinding wheel, a pivot supporting the grinding wheel and being displaceable in a direction at right angles to the axis of the work, the axis of oscillation of the said pivot being at right angles to the axes of rotation of the work and the said wheel, means allowing the adjustment of the grinding wheel in directions parallel with the axis of the wheel and at right angles thereto, and a crank gear for oscillating the grinding wheel on the pivot.

13. In a grinding machine for forming race grooves of ball bearings, the combination with a rotating work holder, of a pivot adjustable transversely of the axis of the work holder, a grinding wheel supported by the pivot and adjustable with respect to the axis of oscillation of the pivot, in both forward and back and lateral directions and means for oscillating the grinding wheel by means of the pivot.

In testimony whereof I have set my signature to this specification in the presence of two subscribing witnesses.

ERNST SACHS.

Witnesses:
  H. BARDEL,
  E. BARDEL.